(12) United States Patent
Quarterman et al.

(10) Patent No.: US 8,560,413 B1
(45) Date of Patent: Oct. 15, 2013

(54) METHOD AND SYSTEM FOR DETECTING DISTRIBUTED INTERNET CRIME

(76) Inventors: John S. Quarterman, Lancaster, NY (US); Peter F. Cassidy, Cambridge, MA (US); Gretchen K. Phillips, Lancaster, NY (US)

(*) Notice: Subject to any disclaimer, the term of this patent is extended or adjusted under 35 U.S.C. 154(b) by 1235 days.

(21) Appl. No.: 11/487,110

(22) Filed: Jul. 14, 2006

Related U.S. Application Data

(60) Provisional application No. 60/699,190, filed on Jul. 14, 2005.

(51) Int. Cl.
*G06Q 40/00* (2012.01)

(52) U.S. Cl.
USPC .............................. 705/35; 705/38

(58) Field of Classification Search
CPC ..................................... G06Q 40/00
USPC ............................................... 705/35
See application file for complete search history.

(56) References Cited

U.S. PATENT DOCUMENTS

| | | | | |
|---|---|---|---|---|
| 6,996,845 | B1* | 2/2006 | Hurst et al. | 726/25 |
| 7,624,444 | B2* | 11/2009 | Gupta et al. | 726/23 |
| 2002/0178162 | A1* | 11/2002 | Ulrich et al. | 707/10 |
| 2004/0023654 | A1* | 2/2004 | Jang | 455/435.1 |
| 2005/0086161 | A1* | 4/2005 | Gallant | 705/39 |
| 2005/0283609 | A1* | 12/2005 | Langford | 713/176 |
| 2006/0080656 | A1* | 4/2006 | Cain et al. | 717/174 |
| 2006/0271490 | A1* | 11/2006 | Kalker | 705/57 |
| 2007/0070921 | A1* | 3/2007 | Quinlan et al. | 370/254 |
| 2008/0167049 | A1* | 7/2008 | Karr et al. | 455/456.2 |

\* cited by examiner

*Primary Examiner* — Bruce I Ebersman
*Assistant Examiner* — John Anderson
(74) *Attorney, Agent, or Firm* — Simpson & Simpson, PLLC

(57) ABSTRACT

The invention broadly comprises a method and service of visualization of Internet nodes involved in distributed electronic crime in order to see patterns of actionable intelligence, such as multiple phishing nodes hosted at the same hosting center, or domain names registered in one country that are actually in another country or nodes related by one or more aspects, such as specific criminal attack campaign, target or technical weakness exploited to ease commandeering of the node. The invention involves collecting topological and latency data including changes over time and using the data to determine probable topological and geographical locations of single or multiple nodes, as well as inferential geolocation.

25 Claims, 3 Drawing Sheets

Inferential Geolocation Reports

METHOD AND SYSTEM FOR DETECTING DISTRIBUTED INTERNET CRIME

CROSS-REFERENCE TO RELATED APPLICATIONS

This application claims the benefit under 35 U.S.C. §119 (e) of U.S. Provisional Application No. 60/699,190, filed Jul. 14, 2005.

FIELD OF THE INVENTION

The invention relates generally to computer network performance and risk management. In particular, the invention relates to a method and system for increasing the security of Internet commerce. More particularly, the invention relates to detecting and visualizing Internet nodes involved in distributed Internet crime, for example, phishing.

BACKGROUND OF THE INVENTION

Commerce continues to embrace the Internet and to become dependent upon it. In banking in particular, deposits, withdrawals, balances, statements, lines of credit, and other financial transactions and instruments are increasingly available via and used over the Internet. Financial institutions that are based on the Internet are even more dependent on it. The organization of the physical retail banking platform in the United States, in fact, has been radically altered over the past 20 years, in large part, assuming a growing proportion of banking transactions would be fulfilled using Internet connectivity between the banking transactional platform and the home (for consumer services) and the office (for business treasury services). Any enterprise that does commerce through the Internet is at risk of financial or identity theft involving the Internet, either directly or through mis-use of its customers' credentials used by fraud perpetrators manipulating online services to complete fraudulent transactions.

Phishing is an example of a problem that such institutions face. Phishing involves stealing a user's identity for purposes of financial gain, usually either by social engineering (luring the customer into submitting online credentials by posing as a trusted business through a counterfeit website) or technical subterfuge (planting software onto a personal computer that will intercept or steal its users on-line credentials and transit them to fraud perpetrators who control the software). Most Internet users are familiar with the annoying electronic mail messages they get claiming to be from a financial institution that needs the user to connect to a web page and supply a missing password or social security number; messages that have the logos and appearance of the financial institution, but which lead to a web page that is not associated with that financial institution. Most people are wary of such messages and do not fall for the trap. But it only takes a small percent to make phishing lucrative for the phisher. In addition to that social engineering approach, technical subterfuge may involve planting spyware on the user's computer via bugs in a web browser or bugs in the user's electronic mail reading program or bugs in the user's operating system or other software; spyware that watches for the user's passwords or other identifying information and reports it back to the phisher. While the amount of actual financial loss from phishing is still low as a proportion of any enterprise's online revenue, any loss from such scams is worrisome.

Damage to reputation is a bigger worry for the targeted enterprises. Already many Internet mail users are wary of believing any mail from financial institutions. This is a problem for those institutions, because they see significant economies of scale in increasing use of the electronic mail and the web for financial transactions. And the reputation damage can extend beyond the Internet: a user who has seen too many phishing messages claiming to be from Bank X may not want to bank at Bank X even through an ATM or teller window. Today, a return to 1970s (pre-ATM and pre-Internet) style banking would cause catastrophic logistical difficulties for the retail banking sector as crowds of customers queued to visit tellers whose numbers had been drastically reduced over the decades. That very squeeze in retail platform service capacity, physically manifest in the retail platform, could easily compound unease already felt in failure of the Internet banking infrastructure and precipitate bank runs or general failure of confidence.

Tracking down phishers is thus a pressing task. A task that law enforcement cannot be expected to do alone, and which it is technically unprepared to complete. Unless the amount stolen in a phishing attack is many thousands of dollars, most law enforcement agencies cannot be expected to take action, because it costs them several thousand dollars just to put an agent on the case. Furthermore, phishers deliberately send phishing mail messages and spyware from compromised computers in different countries from the perpetrator's location, so as to involve multiple countries and multiple law enforcement jurisdictions, thus complicating and very often neutralizing any potential law enforcement actions.

The targeted companies thus need to be proactive and find ways of dealing with phishers or to find enough evidence of aggregate loss or specifically-located illicit activity that law enforcement and collateral victims can take action. For example, if there is sufficient evidence that phishers are using nodes set up for phishing at a specific Internet Service Provider (ISP), often that ISP will take down the phishing node. Or if there is sufficient evidence that a legitimate node has been compromised for phishing, the node's owners, supplied with such evidence, can take action.

Collecting such evidence can be quite difficult, because phishers deliberately falsify evidence such as domain registrations, and they deliberately stage their attacks through multiple layers of nodes in multiple countries so as to make tracing them back difficult and to complicate involving legal actions by going through multiple legal jurisdictions. They often buy access to the nodes they use from third parties known as bot herders, who break into computers in order to compromise them and turn them into so-called zombie PCs or bots, building what they call a bot herd, for sale to miscreants such as phishers. Appropriate evidence must be cross-checked by validation involving multiple sources of information collected over large parts of the Internet. Most targets of phishing do not have the expertise to collect, aggregate, fuse, visualize, analyze, and synthesize such data in order to make decisions and take action based upon it. Internet Service Providers generally do not have the expertise to do this, either, because while they know a great deal about their own networks and about the various Internet mechanisms for registering domain names, netblocks, Autonomous Systems, and other technical infrastructure of the Internet, they do not have experience or expertise in following artifacts through the entire fabric of the Internet beyond their own networks. The problem extends beyond the example of phishing. For example, spammers also often stage their sending of electronic mail messages through servers scattered around the Internet, often buying access to them from the same bot herders that phishers deal with, and such spam servers also often cluster together on the same ISP nodes. Phishing and spamming are thus examples of distributed electronic crime.

There is thus a long-felt need for means of detecting distributed electronic crime node locations and summarizing Internet node data related to distributed electronic crime attacks such as phishing and spamming through a visual medium for the purposes of forensic analysis and remedial and proactive action.

SUMMARY OF THE INVENTION

The present invention, otherwise known as the Electronic Crime Infrastructure Visualization Console (eCIViC™), broadly comprises a method of and system for observing distributed Internet nodes involved in electronic crime by means of compound (multiple samplings over time) and heterogeneous (multiple sampling methodologies) collection and fusion of data on latency, loss, paths, and positions (topological and geographical) and visualization and algorithmic examination for orientation via detection of patterns of similar to Internet Protocol (IP) topology or performance and possibly by inferential geolocation, in order to produce decisions about likely perpetrators or compromised nodes and especially clusters of nodes, which can be delivered to affected parties as actionable intelligence for immediate or later (forensic) intervention or even for proactive intervention regarding clusters of miscreant nodes that have targeted some other victim, but have not yet targeted the organization taking action. The invention is described in terms of an OODA loop, that is, in terms of steps of Observation, Orientation, Decision, and Action that repeat. The OODA loop is as follows:

Observation: The first step is to Observation of the situation.

Input Internet Nodes: The invention takes as input lists of Internet nodes to investigate.

Topographical and Performance Data: For each input list of Internet nodes, the invention then collects topological and Internet Protocol data packet transmission performance data, or accepts such data as input. Appropriate data collection must gather Internet performance data using techniques that simultaneously record topology (including routes that ISPs advertise for packets to travel, paths that the invention actually observes packets traveling, and changes over time) and performance (including packet loss and latency). The techniques used must be able to measure a significant proportion of the critical infrastructure of the entire Internet, because phishers and other perpetrators stage their attacks from nodes all over the Internet, wherever they can find appropriate resources to compromise.

Visualization: Once or as data is collected, it is useful to render it in one or more forms of visualization, taking advantage of the ability of the human eye and brain to comprehend masses of data quickly in visual form.

Orientation: The second step is Orientation, to determine recognizable patterns in the observed data.

Navigation: In addition to being able to display all the node, topology, and performance data in space and time for a given input dataset, the invention also can navigate within the visualization. It can pan and zoom in space and time, in order to focus on interesting or relevant parts of the visualization. It can also visualize different aspects of the data unrelated to performance that are made manifest through analysis and correlation.

Tables and Other Formats: The invention may also use other representations of the data for human inspection, such as tables.

Inferential Geolocation: Either through human inspection and analysis via visualization or through programmatic inspection and analysis of the data, the invention can perform inferential geolocation to determine probable Internet network topological and geographical locations of single or multiple nodes.

Decision: The next step is to make a Decision about what to do based upon the patterns detected in the Orientation step, including inferential geolocation.

Interpretation of Further Data: Orientation may raise questions that can be investigated better with further data. For example, it may be useful to see what other nodes from other datasets are routed similarly to the current nodes under investigation. The decision in such a case is to determine if further relevant data is available and to pull it in if so; in other words, the decision is to go back to the Observation step to get a modified set of observation data (for example increased for wider view, or decreased for more focus).

Identification of Probable Perpetrators or Compromised Computers: Possible types of identification include but are not limited to multiple phishing nodes hosted at the same hosting center, or domain names registered in one country that are actually in another country, or phishing nodes found at a corporate location.

Action: The final step is to take Action based on the Decisions. Reporting as Action: the actions the invention itself involves are forms of reporting, such as reports to targeted organizations such as financial institutions, to compromised entities such as hosting centers, or to law enforcement agencies. The invention may also involve delivery of public reports, some of which may be delivered regularly and inform one or more reputation systems.

Economic or Legal Actions: The invention itself does not take economic or legal actions, although some of the reports it delivers may enable such actions.

The present invention broadly comprises a computer-based method for detecting distributed Internet crime, including the steps of: identifying a pattern in data regarding Internet topology and performance; and identifying, responsive to said pattern, a first cluster of nodes associated with said distributed Internet crime. The steps of identifying a pattern and identifying a first cluster of nodes are performed by at least one general purpose computer specially programmed to perform said steps of identifying a pattern and identifying a first cluster of nodes. In some aspects, the method includes aggregating crime information from a plurality of messages related to said distributed Internet crime and identifying a first cluster of nodes further comprises analyzing said data and said aggregated crime information. The aggregating is performed by said at least one general purpose computer.

In some aspects, the method gathers said crime information from reports by a plurality of targets and detects said crime information using a darknet, where said gathering and detecting are performed by said at least one general purpose computer. In some aspects, identifying a pattern further comprises identifying said pattern from said data and said aggregated crime information. In some aspects, analyzing said data and said aggregated crime information further comprises tracking longevity of at least one server cluster related to said distributed Internet crime. In some aspects, identifying a first cluster of nodes further comprises identifying a first router associated with said first cluster and looking up, in a first public database, a first ISP associated with said first router.

In some aspects, identifying a first cluster of nodes further comprises identifying a first server associated with said first cluster and identifying a first organization associated with said first server. In some aspects, identifying a first cluster of nodes further comprises identifying a second router and server associated with said first cluster and inferentially geolocating respective probable locations for said second router and server. In some aspects, identifying a first cluster of nodes further comprises determining a second ISP having at least one second cluster of nodes associated with said distributed Internet crime or determining an ISP node having a third cluster of nodes associated with said distributed Internet crime and reoccurring over time.

In some aspects, identifying a first cluster of nodes further comprises identifying a tendency for a fourth cluster of nodes associated with said distributed Internet crime to be disposed at a geographical location or identifying topological and geographical movement of a fifth cluster of nodes associated with said distributed Internet crime over time. In some aspects, the method identifies an organization associated with said first cluster of nodes, where said identifying is performed by said at least one general purpose computer. In some aspects, the method visualizes said data, where said visualizing is performed by said at least one general purpose computer. In some aspects, determining a pattern further comprises displaying said pattern in said visualized data or said distributed Internet crime is selected from the group consisting of phishing and spamming.

The present invention also broadly comprises a computer-based system for detecting distributed Internet crime, comprising: means for identifying a pattern in data regarding Internet topology and performance; and means for identifying, responsive to said pattern, a first cluster of nodes associated with said Internet crime, where said means for identifying a pattern and said means for identifying a first cluster of nodes are located in at least one specially programmed general purpose computer. In some aspects, the system includes means for aggregating crime information from a plurality of messages related to said distributed Internet crime and said means for identifying a first cluster of nodes further comprises means for analyzing said data and said aggregated crime information, where said means for aggregating is located in at said least one specially programmed computer.

In some aspects, said means for identifying a pattern further comprises means for identifying said pattern from said data and said aggregated crime information or said means for analyzing said data and said aggregated crime information further comprises means for tracking longevity of at least one server cluster related to said distributed Internet crime. In some aspects, said means for identifying a first cluster of nodes further comprises means for identifying a first router associated with said first cluster and means for looking up, in a first public database, a first ISP associated with said first router.

In some aspects, said means for identifying a first cluster of nodes further comprises means for identifying a first server associated with said first cluster and means for identifying a first organization associated with said first server. In some aspects, said means for identifying a first cluster of nodes further comprises means for identifying a second router and server associated with said first cluster and means for inferentially geolocating respective probable locations for said second router and server. In some aspects, said means for identifying a first cluster of nodes further comprises means for determining a second ISP having at least one second cluster of nodes associated with said distributed Internet crime or means for determining an ISP node having a third cluster of nodes associated with said distributed Internet crime reoccurring over time.

In some aspects, said means for identifying a first cluster of nodes further comprises means for identifying a tendency for a fourth cluster of nodes associated with said distributed Internet crime to be disposed at a geographical location or means for identifying topological and geographical movement of a fifth cluster of nodes associated with said distributed Internet crime over time. In some aspects, the system includes means for identifying an organization associated with said first cluster of nodes, where said means for identifying is located in said at least one specially programmed computer. In some aspects said distributed Internet crime is selected from the group consisting of phishing and spamming.

The present invention further broadly comprises a method for detecting distributed Internet crime, including the steps of: detecting patterns in topological connections, performance, and locations of Internet nodes; and identifying, using said patterns, nodes involved in attacks on an enterprises.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

Figure 1:
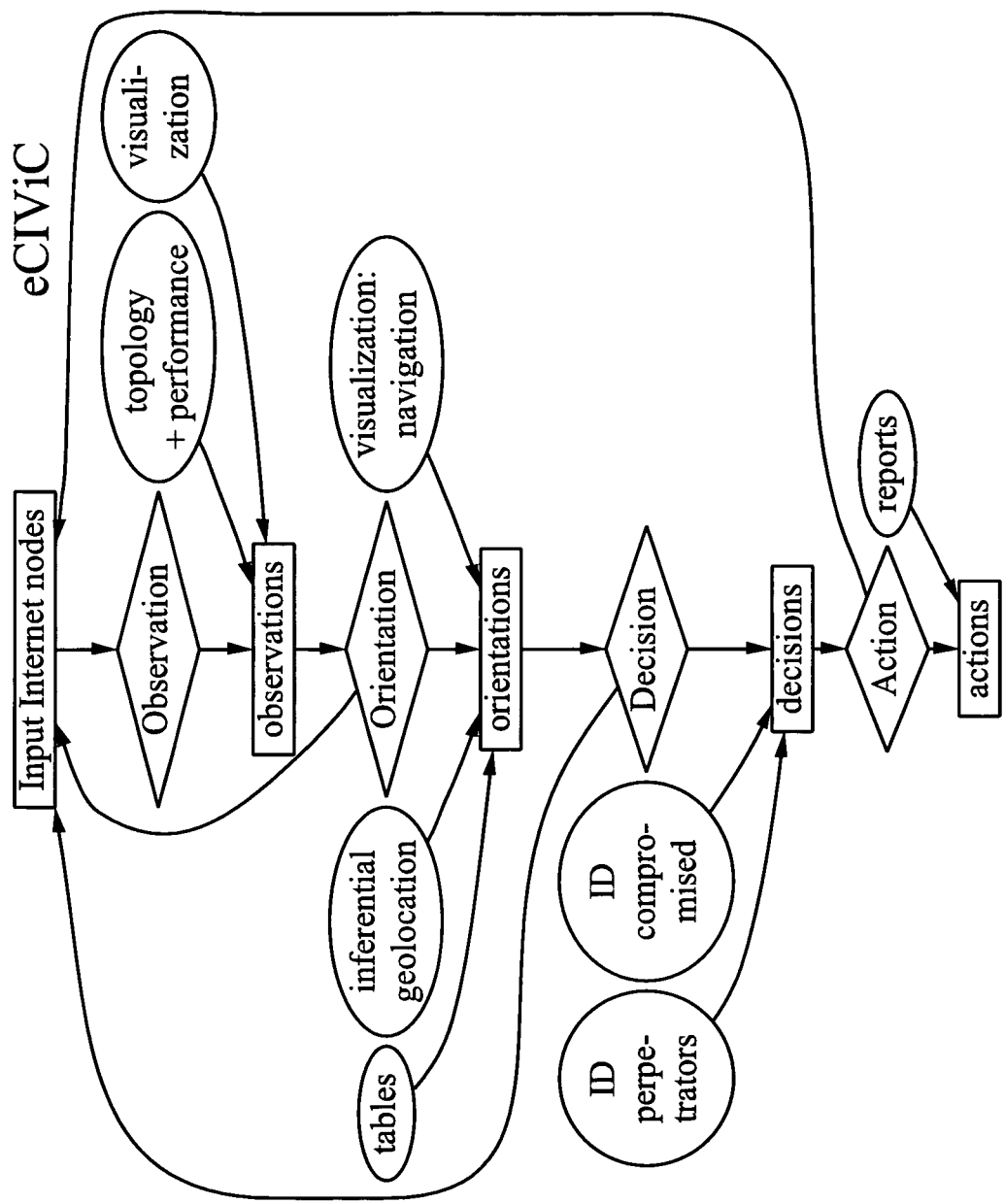
FIG. 1 is a flow chart illustrating a present invention method.

The form of the OODA loop used in the present invention is illustrated in FIG. 1. The invention described is a method of observing Internet nodes involved in distributed electronic crime by means of data collection and visualization for orientation via patterns of similar Internet Protocol (IP) topology or performance, and possibly via inferential geolocation, in order to produce decisions about likely perpetrators or compromised nodes, which can be delivered to affected parties as actionable intelligence. Examples of such actionable intelligence about distributed electronic crime include clusters of nodes connected to the same ISP and all involved in phishing or spamming, where the ISP and the putative owners of each node are identified, along with their topological interconnections, and possibly plus their geographical locations. The discussion that follows uses phishing as an example of distributed electronic crime. However, it should be understood that the present invention can be used for any type of distributed Internet crime, including but not limited to spamming. The invention is described in terms of an OODA loop, that is, in terms of steps of Observation, Orientation, Decision, and Action that repeat. The OODA loop is a concept well known in law enforcement circles; it derives from military strategy and is also rather widely known in corporate strategy.

Observation: The first step is to Observe the situation.

Input Internet Nodes: The invention takes as input lists of Internet nodes to investigate. These input lists can be, for example, URLs used in phishing mail messages, that is, URLs for web pages that the phishing mail attempts to deceive the reader into thinking are legitimate web pages associated with a legitimate business, but which are actually not associated with that legitimate business. Such URLs may be compiled by observing phishing mail and noting URLs that do not lead to web servers and/or associated Internet domains actually owned by the legitimate business. The invention then parses domain names or IP addresses from the URLs by the usual URL syntax rules as specified in RFC 1808, "Relative Uniform Resource Locators," R. Fielding, June 1995 and RFC 1738, "Uniform Resource Locators (URL)", T. Berners-Lee, L. Masinter, M. McCahill, December 1994.

Input lists of Internet nodes could also be compiled by observing Internet addresses used by spyware planted by phishing scams. Input lists of Internet nodes could also be compiled by observing senders of phishing mail. Input lists of Internet nodes could also be compiled by observing senders of spam mail. Many other methods of compiling initial lists of input nodes could be used.

Topological and Performance Data Collection: For each input list of Internet nodes, the invention collects topological and performance data, or accepts such data as input. Appropriate data collection must gather Internet performance data using techniques that simultaneously record topology (including routes that ISPs advertise for packets to travel, paths that the invention actually observes packets traveling, and changes over time) and performance (including packet loss and latency). The techniques used must be able to measure a significant proportion of the critical infrastructure of the entire Internet.

Visualization: Once or as data is collected, it is useful to render it in one or more forms of visualization, taking advantage of the ability of the human eye and brain to comprehend masses of data quickly in visual form. Appropriate visualization should be capable of showing topology, IP packet transmission performance, and changes over time, together with nodes labeled with IP addresses, domain names, or other identifying information. Color is very useful in making similar information readily comprehensible. Labeling (by time; by brandholding target; by suspected crime group; by specific eCrime campaign, etc) of members of a group of nodes recruited for the animation of a phishing campaign or electronic crime in an animation can also help distill forensic aspects that can inform remedial action. Visualization is useful both for pattern recognition and for display of patterns, whether recognized by visual inspection or by automated algorithms.

Orientation: The second step is Orientation, to determine recognizable patterns in the observed data. Some patterns are recognized by visual inspection; others by automated detection via algorithms. Some patterns of interest are recognizable in data from a single time. Such patterns may become more relevant if they persist over time, that is, if they are recognizable across multiple data collection scans. Some patterns may only be recognizable if they persist over time. Many patterns are recognizable in topological data, such as clusters of phishing nodes connected to the Internet via the same ISP node or via a sequence of Internet Protocol addresses associated with a single ISP. Some patterns also require geographical information, such as the geographical location of a given ISP node, or clusters of phishing nodes in a given geographical location across multiple ISPs. Such geographical information can be obtained using inferential geolocation as further described below.

Visualization: Navigation: For visualization of topology and performance data, including panning and zooming in space and time, the present invention may use the previous invention described in Method and Apparatus for Aggregating, Condensing, Supersetting, and Displaying Network Topology and Performance Data, U.S. patent application Ser. No. 11/271,061. U.S. patent application Ser. No. 11/271,061 is incorporated by reference herein.

In addition to being able to display all the node, topology, and performance data in space and time for a given input dataset, the invention also can navigate within the visualization. It can pan and zoom in space and time, in order to focus on interesting or relevant parts of the visualization. The present invention can also visualize different aspects of the data unrelated to performance that are made manifest through analysis and correlation. Such visualization navigation is especially useful for visually recognizing patterns that can be encoded in algorithms for automated detection.

Tables and Other Formats: The invention may also use other representations of the data for human inspection, such as tables. Visualizations of masses of data, such as clusters of phishing nodes, are very useful for showing that there are clusters, and where they are clustered, just as a picture of a tree can show how its leaves cluster. However, there are limits to the amount of information that can be rendered for direct reading from a picture, just as a picture of a tree will not make every leaf visible; some leaves will be obscured by others. Thus visualizations are normally delivered accompanied by tables of the relevant nodes and their identifying information.

Figure 2:
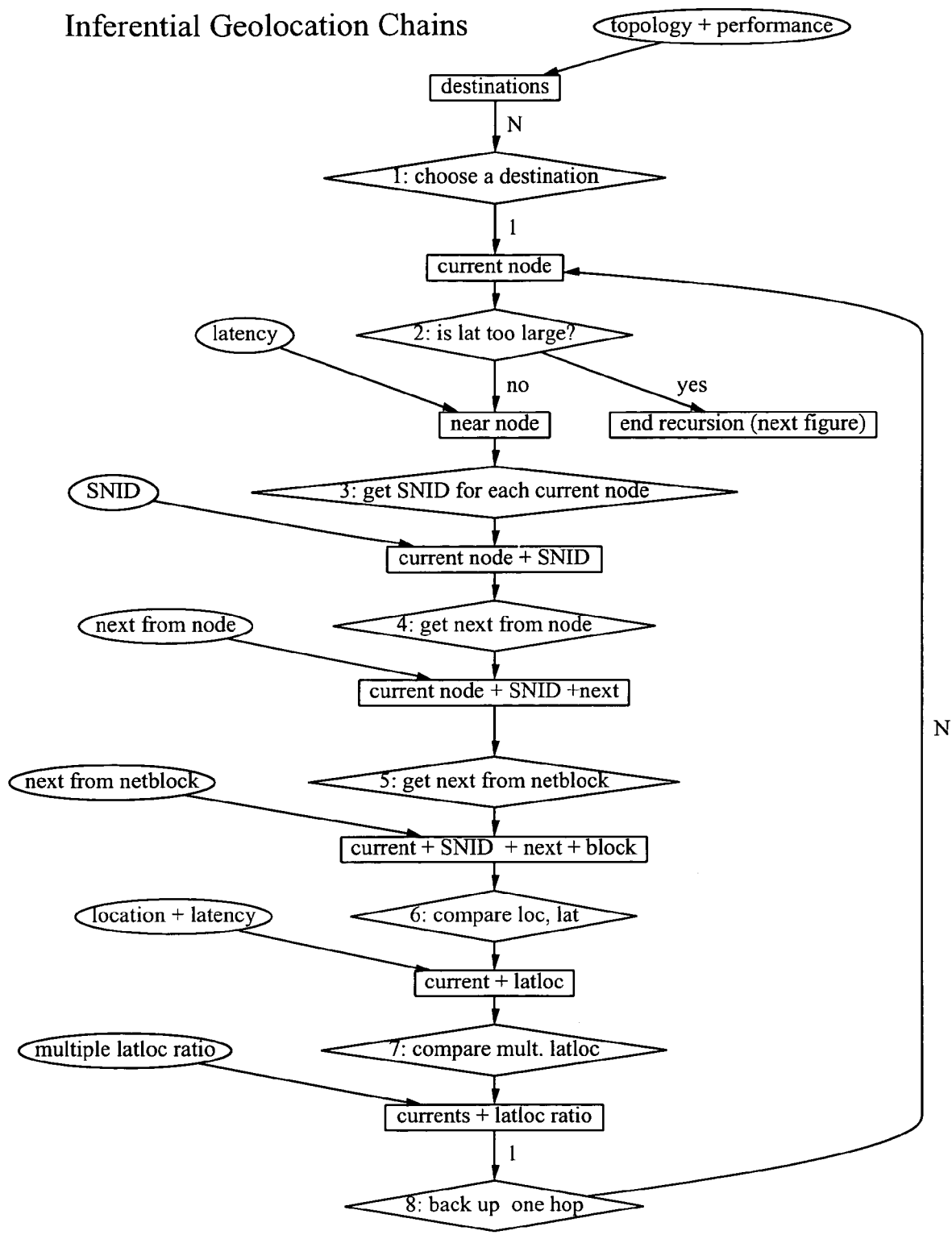
FIG. 2 is a flow chart illustrating inferential geolocation chains.
Figure 3:
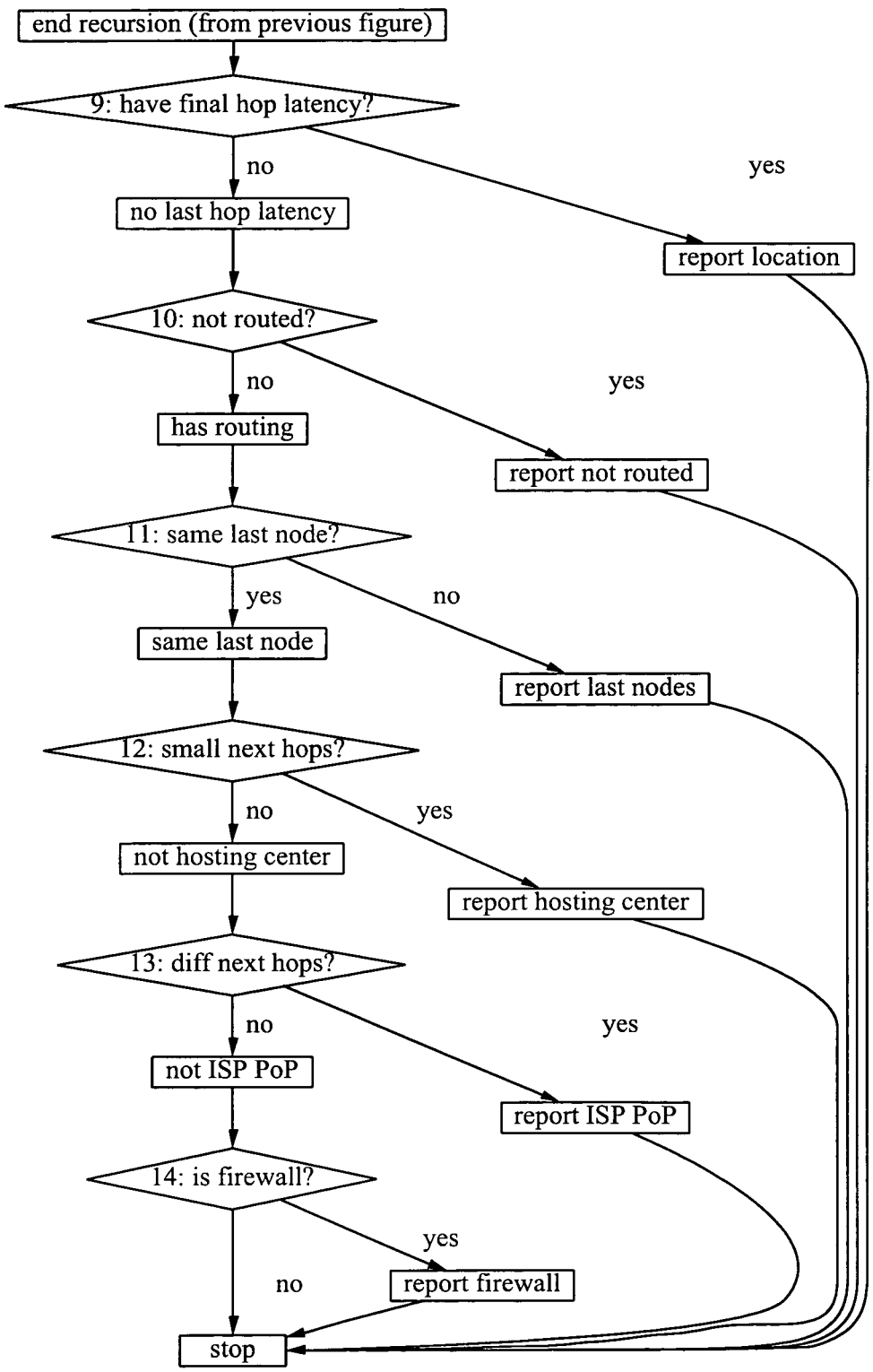
FIG. 3 is flow chart illustrating inferential geolocation reports.

Inferential Geolocation: Inferential geolocation is illustrated in FIG. 2 and FIG. 3. The invention can perform inferential geolocation to determine probable topological and geographical locations of single or multiple nodes and present this information for both human inspection and programmatic inspection via visualization techniques, figures, tables or other data presentation formats. Inferential geolocation combines Internet network topology data with performance data to infer the location of one or more nodes from the locations of other nodes.

Certain information is known or can be determined about each destination node using standard Internet protocols: its IP address, its netblock, usually its Autonomous System number (ASN), often its domain name in the Domain Name System (DNS), and often its domain name registration, netblock registration, ASN registration, and ISP, and perhaps other information; let us refer to all this information as standard node identification (SNID).

Domain name of the node: The domain name of the node is often discoverable via reverse DNS lookup. ISPs often indicate the metropolitan area of a router by encoding location information into its domain, such as airport codes, for example lax for Los Angeles or aus for Austin. Router domain names sometimes have location indicators for both ends of the link traversed for that router.

Netblock of the node: The netblock of a node is often discoverable by looking up its The IP address in public databases. Such databases often include information about the owner and location of the netblock. While ISP netblocks may span wide geographic areas, sometimes they are for metropolitan areas or ISPs.

Autonomous System Number (ASN) for the node: The ASN of a node is often discoverable by looking up its The IP address in public databases. Such databases often include information about the owner and location of the ASN. While an ASN may span wide geographic areas, sometimes an ASN is for a small geographical area. The ASN also usually leads to the name of the owning ISP or corporation or individual.

Other information may be deducible for the node. For example, it may be in a reserved IP address space that is not supposed to be used for routing. Or it may be in an address space known to be allocated to a geographic region, such as Asia Pacific (AP), and that information may be available even when a specific netblock is not.

However, little if any of this information can be trusted for the destination node, because perpetrators of phishing and other scams deliberately falsify or obfuscate information. In addition, location information derived from, for example, domain name registrations, is notoriously unreliable. A single domain, such as ibm.com, can have nodes in thousands of different locations, while the domain registration usually lists no more than three locations. And even for domains with only one location, it is not uncommon for the administrative address of the domain name registration to be different from the physical address of any computers serving information for or from that domain. Even the registration of the netblock of the destination can be unreliable as a source of location information, because it is also common for a netblock to be registered with one Internet Protocol address yet hosted at another address.

Inferential geolocation depends on information that is not under the control of the destination IP node or its owner; that is, information that the ecrime perpetrator cannot readily subvert. It depends on information about the nodes leading to the destination and about the speed of hops between the nodes. Such routing nodes are normally controlled by ISPs that are not under the control of any destination. While it is possible that a sufficiently rich or influential perpetrator could compromise an ISP, the more information collected from the more routes and the more ISPs, the less likely any perpetrator could compromise all of them.

A key factor in inferential geolocation is the speed of light. If a minimum latency between two nodes can be established with confidence, that latency simultaneously establishes a maximum geographical distance between the nodes, by simple arithmetic: d=c*l where d is distance, c is the speed of light, and l is the latency. Since c is a fixed constant, approximately 186,282 miles per second or 300,000 kilometers per second, an l of one millisecond yields d of about 186 miles or 300 km. (The precise speed does vary depending on whether the actual physical carrier is photons in optical fiber or electrons in copper or microwaves in air or some other physical carrier, but such differences of speed are negligible for the purposes of this calculation. Processing time in intermediate IP nodes can be more significant, but the key time is the minimum time before processing time is taken into account.) While a few hundred miles is a long way in a built-up area, it is very short compared to trans-continental, trans-Atlantic, or trans-Pacific distances. Because many perpetrators attempt to indirect their scams through nodes in different countries on different continents, speed of light comparisons produce sufficient precision to help make important determinations as to the national location and often the city of a node.

Establishing a latency with confidence is problematical, due to changes in performance over time, differing speeds of routers, and deliberate deprioritization by some routers of probe packets addressed for them. These complications can be addressed by collecting multiple probes on each scan, by collecting regular scans over time, by collecting scans from several probe sources, by collecting scans of many destinations, and thus establishing a baseline dataset. This baseline data set can be used to recognize patterns such as a slow router followed by a fast router. A slow router followed by a fast one could manifest itself with a negative latency for the fast router. That example pattern may lead to a latency for the fast router that appears to be negative. In such a case, one approach that works is to examine multiple paths to the fast router and seek ones that do not show that pattern.

The basic steps of inferential geolocation are as follows. These steps assume that destination nodes (sometimes called destinations in the steps below) have been selected, that IP topological and performance data is already being collected, and that the steps below involve IP topology where not otherwise specified. For example, next nodes means next IP topologically adjacent nodes.

Step 1: Choose a destination node to examine and call it a current node.

Step 2: If the latency from all the current nodes to the next node is too large for the geographical distance of interest, go to step 9. For example, l more than 10 milliseconds is probably trans-oceanic or trans-continental. L less than 1 millisecond is usually enough to make it plausible that the nodes on either side of a link are in the same metropolitan area, and l less than 0.2 millisecond makes it almost certain.

Step 3: For each current node, determine its SNID and any related location information.

Step 4: Determine next (IP topologically adjacent) nodes from the current node. Other nodes may be reachable through the current node, and may be discoverable by examination of a larger set of topological and performance data collected for a larger set of destinations. If several such nodes can be shown to be in a given location, such as a city or a country, and the latency to them from the current node is small, the current node is probably also in or near that city or country. The smaller the latencies, the more likely the current node is in the same location. The fewer such nodes that are in different locations, also the more likely the current node is in the same location.

Step 5: Determine next nodes from the current node's netblock. Other nodes may be reachable through the current node's netblock, and may be discoverable by examination of a larger set of topological and performance data collected for a larger set of destinations. If several such nodes can be shown to be in a given location, such as a city or a country, and the latency to them from the current node is small, the current node is probably also in or near that city or country. The smaller the latencies, the more likely the current node is in the same location. The fewer such nodes that are in different locations, also the more likely the current node is in the same location. The proportion of nodes at the next hop from the netblock that are in the same location vs. ones that are in different locations is more important for next nodes from the current node's netblock than for next nodes from the current node, since this method depends upon the netblock being located in a small geographic area.

Step 6: For each current node, if a geographical location has been found, and if the latency to the next node is small, the next node is likely to be in or near the same geographical location. The smaller the latency, the more likely the next node is to be in the same location.

Step 7: If there is more than one current node, and geographical locations have been determined for more than one of them, and the geographical locations for several of the current nodes are the same, and latencies from each of those co-located current nodes to the next node are small, then the next node is even more likely to be in the same location. However, if another current node is in a different location than the other current nodes, and latency from it to the next node is small, the location of the next node is less certain.

Step 8: Call the current node the next node, back up one hop to the previous node or nodes, and examine latencies to the next node. For each previous node, call it the current node, and go to step 2.

Step 9: The longer the chain of nodes backwards from the destination that have the same location and small latencies, and, more importantly, the more they branch, the more likely the destination is in or near the same location they are. The smaller the latencies, the closer the destination is to their location. If latency was recorded for the last hop to the destination, this is usually sufficient location determination: report probability of location and stop here.

Step 10: If all the paths from the probe sources are different, with no common nodes, the destination is probably not being routed. If it also does not respond to the protocol it is supposed to be serving, such as HTTP GET via TCP for a web server, it is probably no longer on the Internet, and nothing further can be determined about it: report destination no longer routed and stop here.

Step 11: If all the paths from the probe sources converge on the same last responding node before the destination, that last responding node may be a hosting center or an ISP Point of Presence (PoP) or a corporate firewall. In such a case, the location of that last responding node is usually the same as the location of the destination. And for purposes of reports, that last responding node is associated with the organization that is providing hosting or connectivity for the destination, which may be as relevant as information about the destination itself. If not, report probability of location of the various last hops and stop here.

Step 12: If the last responding hop has many other next hops to other destinations, all with very small latencies, it is probably a hosting center. This is confirmed if it has a web server associated with its main domain that says it is a hosting center. Such a node usually will have a netblock registered to an ISP. If the hosting center has only one location, the destination is probably in that location. If the hosting center has more than one location, the destination could be in any of them. Which one can sometimes be determined by noting the location of the last responding hop, although some hosting organizations may have their own distributed networks that do not respond to probes. If the above evidence indicates the last responding hop is probably a hosting center, report the identity and likelihood of location of the hosting center organization and stop here.

Step 13: If the node has a netblock registered to an ISP, or if the last responding hop has many other next hops to other destinations, with small but varying latencies, it is probably an ISP PoP. Such a PoP will usually not have an associated web server, although the ISP may have web pages that designate a PoP in the same city as the PoP. If the above evidence indicates the last responding hop is probably an ISP PoP, report the identity and likelihood of location of the ISP PoP and stop here.

Step 14: If the last responding hop has no other next hops, it is probably a corporate firewall. This is confirmed if it has a web server associated with the corporation or an ASN registered to the corporation: report the identity and likelihood of location of the corporation and its firewall and stop here.

Decision: The next step is to make a Decision about what to do, based on the patterns detected in the Orientation step, including inferential geolocation.

Interpretation of Further Data: Orientation may raise questions that can be investigated better with further data. For example, it may be useful to see what other nodes from other datasets are routed similarly to the current nodes under investigation. The decision in such a case is to determine if further relevant data is available and to pull it in if so; in other words, the decision is to go back to the Observation step.

An individual target of phishing usually cannot detect phishing clusters, since one target does not normally see the phishing messages directed at customers of another target. Yet aggregation of information from phishing messages reported by multiple targets (or detected by other means such as darknets, that is, networks that are routed yet have no production clients or servers on them, or honeypots, that is, computers that run production services for the purpose of being attacked by miscreants in order to detect such attacks) can facilitate identification of such clusters. The invention combines such information from phishing messages with additional Internet topological and performance information in order to detect such clusters via manual inspection of visualizations or by automated algorithms. By regular analysis of this combined information the invention tracks longevity of phishing server clusters. By visualization the invention presents these results in a graphical manner quickly graspable by the viewer. By lookup of the associated ISP routers in public databases, the invention then identifies which ISPs are involved. By similar database lookups the invention determines which phishing servers appear to be associated with legitimate organizations that have been compromised.

By inferential geolocation the invention can determine where the phishing servers and the associated ISP routers are probably located; this is useful in determining the relevant legal jurisdiction. Such information can also be used to determine which ISPs have multiple phishing clusters, which ISP nodes have clusters that go away and come back, which geographical locations tend to have phishing clusters, and how phishing clusters targeting specific targets move around topologically and geographically over time.

Identification of Probable Perpetrators or Compromised Computers: Possible types of identification include but are not limited to multiple phishing nodes hosted at the same hosting center, or domain names registered in one country that are actually in another country.

Action: The final step is to take Action. The actions the invention itself involves are forms of reporting, The invention itself does not take economic or legal actions, although some of the reports it delivers may enable such actions.

Delivery of Reports to Targeted Organizations: The invention may deliver reports to enterprises targeted by phishing scams or other attacks, saying which organizations appear to be involved in the attacks and whether those organizations appear to be perpetrators or were themselves compromised. Such reports will emphasize both identification and aggregation. Identification of likely nodes and organizations that are involved is the meat of the report, so that the targeted enterprise will have concrete entities with which to deal. Aggregation of multiple involved organizations at the same hosting center, ISP, geographical location, or other aggregation point is the sauce of the report, providing emphasis of particular problem areas that if dealt with may have greater effect than others.

Delivery of Reports to Compromised Entities: The invention may deliver reports to compromised entities, such as hosting centers or ISPs or enterprises or individuals. Such entities often do not know that their computers have been compromised, and, if alerted, will deal with the compromise. Even organizations that are complicit in the illicit activities may take action when alerted, in order to avoid being revealed as complicit. Such reports to compromised entities thus may not only help honest entities to take action, but may also help turn complicit entities honest and get them to take action, too.

Delivery of Reports to Law Enforcement: The invention may also deliver reports to law enforcement, although more frequently it is expected that the targeted enterprises or compromised entities will draw from the reports they receive if they choose to involve law enforcement.

Delivery of Public Reports: The invention may deliver reports to the public, since it is in the public interest to know who is targeted by or involved in phishing and other scams.

Ongoing Reputation Systems: The invention may deliver public reports regularly, as a form of reputation system. Targeted enterprises may not voluntarily reveal that they are targeted, even though their customers may already know it, since for example phishing involves sending enticement messages to customers of targeted enterprises. Customers of enterprises in a particular industry, such as financial services, may want to know which enterprises are targeted by which scams, and which other organizations are involved in perpetrating such scams, whether complicity or having been compromised themselves.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A computer-based method for detecting distributed Internet crime, comprising the steps of:
    collecting, using a processor for at least one specially programmed general purpose computer, first data regarding a plurality of Internet nodes, wherein the first data is collected at a first time, wherein the first data is collected by a method free of collection modifications to Internet nodes in the plurality of Internet nodes, and wherein collecting the first data includes performing first multiple scans, including first multiple probes transmitted to multiple destinations, of the plurality of Internet nodes;
    generating, using the processor and the first data, first topology and performance data for a first plurality of destinations associated with distributed Internet crime and first Internet topology or performance, the first topology and performance data with respect to at least one router for the first plurality of destinations;
    identifying, using, the processor and the first topology and performance data, a first node from the plurality of Internet nodes to which the at least a portion of the first plurality of destinations is connected;
    generating, using the processor, second topology and performance data for at least one first destination connected to the first node and not associated with the first Internet topology or performance;
    inferentially geolocating the first node, using the processor, by comparing the first and second topology and performance data, wherein comparing the first and second topology and performance data includes comparing respective latencies in the first and second topology and performance data;
    collecting second data, using the processor, regarding the plurality of Internet nodes, wherein the second data is collected at a second time, later than the first time, wherein the second data is collected by a method free of collection modifications to Internet nodes in the plurality of Internet nodes, and wherein collecting the second data includes performing second multiple scans, including second multiple probes transmitted to multiple destinations, of the plurality of Internet nodes;
    generating, using the processor and the second data, third topology and performance data for a second plurality of destinations associated with distributed Internet crime and second Internet topology or performance, the third topology and performance data with respect at least one router for the second plurality of destinations;
    identifying, using the processor and the third topology and performance data, connection between the first node and at least a portion of the second plurality of destinations;
    generating, using the processor, fourth topology and performance data for at least one second destination connected to the first node and not associated with the second Internet topology or performance;
    inferentially geolocating the first node, using the processor, by comparing the third and fourth topology and performance data, wherein comparing the third and fourth topology and performance data includes comparing respective latencies in the third and fourth topology and performance data; and,
    generating, using the processor, a report identifying an organization associated with the distributed Internet crime.

2. The method of claim 1 further comprising aggregating, using the processor, crime information from a plurality of messages related to said distributed Internet crime.

3. The method of claim 2 further comprising gathering, using the processor, said crime information from reports by a plurality of targets and detecting said crime information using a darknet.

4. The method of claim 1 wherein generating first and second topology and performance data further comprises tracking longevity of at least one server cluster related to said distributed Internet crime.

5. The method of claim 1 wherein identifying a first node from the plurality of Internet nodes further comprises identifying a router associated with said first node and looking up, in a public database, an ISP associated with said router.

6. The method of claim 1 wherein identifying a first node from the plurality of Internet nodes further comprises identifying a server associated with said first node and identifying an first organization associated with said server.

7. The method of claim 1 wherein identifying a first node from the plurality of Internet nodes further comprises identifying a router and server associated with said first node and inferentially geolocating respective probable locations for said router and server.

8. The method of claim 1 wherein identifying a first node from the plurality of Internet nodes further comprises determining an ISP having at least one cluster of nodes associated with said distributed Internet crime.

9. The method of claim 1 wherein identifying a first node from the plurality of Internet nodes further comprises determining an ISP node having a cluster of nodes associated with said distributed Internet crime and reoccurring over time.

10. The method of claim 1 wherein identifying a first node from the plurality of Internet nodes further comprises identifying topological and geographical movement of a cluster of nodes associated with said distributed Internet crime over time.

11. The method of claim 1 further comprising identifying, using the processor, an organization associated with said first node.

12. The method of claim 1 further comprising visualizing, using the processor, said first and second data.

13. The method of claim 1 wherein said distributed Internet crime is selected from the group consisting of phishing and spamming.

14. A computer-based system for detecting distributed Internet crime, comprising at least one specially programmed general purpose computer with a processor for:
    collecting first data regarding a plurality of Internet nodes, wherein the first data is collected at a first time, wherein the first data is collected by a method free of collection modifications to Internet nodes in the plurality of Internet nodes, and wherein collecting the first data includes performing first multiple scans, including first multiple probes transmitted to multiple destinations, of the plurality of Internet nodes;

generating, using the first data, first topology and performance data for a first plurality of destinations associated with distributed Internet crime and first Internet topology or performance, the first topology and performance data with respect to at least one router for the first plurality of destinations;

identifying, using the first topology and performance data, a first node from the plurality of Internet nodes to which the at least a portion of the first plurality of destinations is connected;

generating second topology and performance data for at least one first destination connected to the first node and not associated with the first Internet topology or performance;

inferentially geolocating the first node by comparing the first and second topology and performance data, wherein comparing the first and second topology and performance data includes comparing respective latencies in the first and second topology and performance data;

collecting second data regarding the plurality of Internet nodes, wherein the second data is collected at a second time, later than the first time, wherein the second data is collected by a method free of collection modifications to Internet nodes in the plurality of Internet nodes, and wherein collecting the second data includes performing second multiple scans, including second multiple probes transmitted to multiple destinations, of the plurality of Internet nodes;

generating, using the second data, third topology and performance data for a second plurality of destinations associated with distributed Internet crime and second Internet topology or performance, the third topology and performance data with respect at least one router for the second plurality of destinations;

identifying, using the processor and the third topology and performance data, connection between the first node and at least a portion of the second plurality of destinations;

generating fourth topology and performance data for at least one second destination connected to the first node and not associated with the second Internet topology or performance;

inferentially geolocating the first node by comparing the third and fourth topology and performance data, wherein comparing the third and fourth topology and performance data includes comparing respective latencies in the third and fourth topology and performance data; and, generating, using the processor, a report identifying an organization associated with the distributed Internet crime.

15. The system of claim 14 wherein the processor is for aggregating crime information from a plurality of messages related to said distributed Internet crime.

16. The system of claim 15 wherein the processor is for tracking longevity of at least one server cluster related to said distributed Internet crime.

17. The system of claim 14 wherein the processor is for identifying a router associated with said first node and for looking up, in a public database, an ISP associated with said router.

18. The system of claim 14 wherein the processor is for identifying a server associated with said first node and for identifying an organization associated with said server.

19. The system of claim 14 wherein the processor is for identifying a router and server associated with said first node and for inferentially geolocating respective probable locations for said router and server.

20. The system of claim 14 wherein the processor is for determining an ISP having at least one cluster of nodes associated with said distributed Internet crime.

21. The system of claim 14 wherein the processor is for determining an ISP node having a cluster of nodes associated with said distributed Internet crime reoccurring over time.

22. The system of claim 14 wherein the processor is for identifying a tendency for a cluster of nodes associated with said distributed Internet crime to be disposed at a geographical location.

23. The system of claim 14 wherein the processor is for identifying topological and geographical movement of a cluster of nodes associated with said distributed Internet crime over time.

24. The system of claim 14 wherein the processor is for identifying an organization associated with said first node.

25. The system of claim 14 wherein said distributed Internet crime is selected from the group consisting of phishing and spamming.

\* \* \* \* \*